United States Patent

Feuerstacke

[11] Patent Number: 6,156,261
[45] Date of Patent: Dec. 5, 2000

[54] METHOD AND DEVICE FOR POSITIONING THE MOUTH OF A CONSUMABLE LANCE

[75] Inventor: Ewald Feuerstacke, Dorsten, Germany

[73] Assignee: Mannesmann AG, Düsseldorf, Germany

[21] Appl. No.: 09/367,173

[22] PCT Filed: Feb. 10, 1998

[86] PCT No.: PCT/DE98/00442

§ 371 Date: Aug. 9, 1999

§ 102(e) Date: Aug. 9, 1999

[87] PCT Pub. No.: WO98/36101

PCT Pub. Date: Aug. 20, 1998

[30] Foreign Application Priority Data

Feb. 12, 1997 [DE] Germany .................. 197 07 319

[51] Int. Cl.$^7$ ........................................ C21B 7/16
[52] U.S. Cl. ........................................ 266/47; 266/225
[58] Field of Search .................. 266/225, 226, 266/47, 44

[56] References Cited

U.S. PATENT DOCUMENTS 4,653,730  3/1987  Wunsche et al. ............ 266/47
4,729,548  3/1988  Sullins ........................ 266/44

Primary Examiner—Scott Kastler
Attorney, Agent, or Firm—Cohen, Pontani, Lieberman & Pavane

[57] ABSTRACT

A method and device for positioning the mouth of a consumable lance that conveys gaseous and/or solid media into a metallurgical vessel containing liquid metal. The lance is guided tangentially to the furnace vessel in a plane which lies above the liquid level of the metal situated inside the vessel. In the mouth area of the lance outside the vessel, the lance is bent toward the vessel interior through a predetermined radius in order to position the lance mouth in the shape of a fan. The lance is then pushed through the side wall of the vessel into the interior of the same to reach or maintain a desired position of the lance mouth.

15 Claims, 4 Drawing Sheets

METHOD AND DEVICE FOR POSITIONING THE MOUTH OF A CONSUMABLE LANCE

BACKGROUND OF THE INVENTION

1. Field of the Invention

The invention relates to consumable lances for the top-blowing of gas and/or carbon particles, and more particularly to a method and device for positioning the mouth of a consumable lance.

2. Description of the Related Art

EP 0,723,129 A2 has disclosed an arc furnace in which both fixed and adjustable lances are guided through the furnace vessel wall. These lances enable a very wide variety of media to be introduced onto or into the molten material. This document makes no further mention of a manipulator which enables the adjustable lance to be moved into a waiting position and into an operating position.

DE 40 34 809 has disclosed a device for the manipulation of the lances for blowing in oxygen and/or carbon, in particular in front of an arc furnace. This device has a tower with bearing arm and components with which the differently designed lances, including the feed hoses, can be moved.

A drawback is that such a manipulator requires a furnace platform with a relatively high freedom of movement. An expensive and technically complex handling implement is required in order to position the lance tip. To reach a defined position, a large number of movements of the manipulator are required, including a change in the location of the implement itself.

Lances of predeterminable length are replaced by new lances after they have burnt down beyond a permissable length.

SUMMARY OF THE INVENTION

The invention is based on the object of providing a method and a device for positioning the mouth of a consumable lance, in which the above-mentioned drawbacks are avoided and in which it is possible, with simple means and a minimum of material, to position the lance tip as desired while using particularly little space on the furnace platform.

According to the invention, the lance is guided essentially tangentially to the furnace vessel, in a plane above the liquid level. A relatively small opening, in particular a slot-like opening which is directed vertically, is provided in the furnace vessel for the lance. Outside the furnace vessel, in the vicinity of the furnace aperture, the lance is bent such that its front area projects through the furnace wall into the furnace interior.

The mouth of the lance can be positioned in a wide area in the furnace interior simply by acting on the axis of rotation of the straight part of the pipe, which is situated essentially outside the furnace, and by effecting the change in bending radius and the rate at which the lance is pushed in.

Depending on the lance burn-off, it is possible to arrange a new lance section between the hose and remaining lance in good time during breaks in production. The result is a quasi-endless lance, in which each of the individual lance parts is fully consumed.

Advantageously, a force which effects elastic bending may be applied to the lance in the bending area. If the bending force is reduced in a controlled manner, the mouth of the lance moves elastically into the desired position.

If necessary, this force can also be applied at such a level that plastic deformation of the pipe end piece is effected in order to achieve a predeterminable radius.

The individual pipe sections are joined together essentially by connecting sleeves or by direct welding. Advantageously, this weld point is protected by a monitoring system and by reducing the bending force to a predetermined permissible level.

The bending device essentially comprises three rolls which are provided opposite one another on both sides of the lance. In addition, further guide and/or drive rolls are provided in particular in the straight part of the lance.

To bend the lance in the area in front of the furnace-wall opening, at least one of the rolls is displaceable, specifically the last and/or the penultimate roll, as seen in the lance feed direction. The use of a hydraulic piston-cylinder unit represents an advantageous configuration of the displacement unit. The use of non-flammable liquids makes it possible to arrange such a simple component particularly close to the area of the furnace opening.

Furthermore, it is proposed to arrange the lance-bending and driving device on a platform. This platform is tiltable and/or pivotable and allows the lance to be positioned as desired and to be removed easily from the furnace in a particularly simple manner using adapted drive elements. The pivot axis of this platform is preferably arranged such that an imaginary line into the furnace vessel intersects the furnace wall at the point at which the vessel aperture is situated, i.e. at which the lance passes into the furnace interior. This design allows the already-bent lance to be moved in such a way that the lance in the opening moves about a specific point, with the result that only a particularly small hole is required in the furnace wall. Such a small opening can be sealed particularly easily.

A force-measuring device is provided in order to detect the bending force for the elastic and/or plastic deformation of the lance end piece. The force-measuring device enables the bending force to be set in a defined manner.

If external connecting sleeves are used to connect two pipe sections, a displacement-measuring device is provided, which signals to the bending device when the sensitive connection piece moves past the displacement unit, in order for the bending force to be suitably reduced.

BRIEF DESCRIPTION OF THE DRAWINGS

An example of the invention is shown in the appended drawings, in which.

DETAILED DESCRIPTION OF THE PREFERRED EMBODIMENTS

Figure 1:
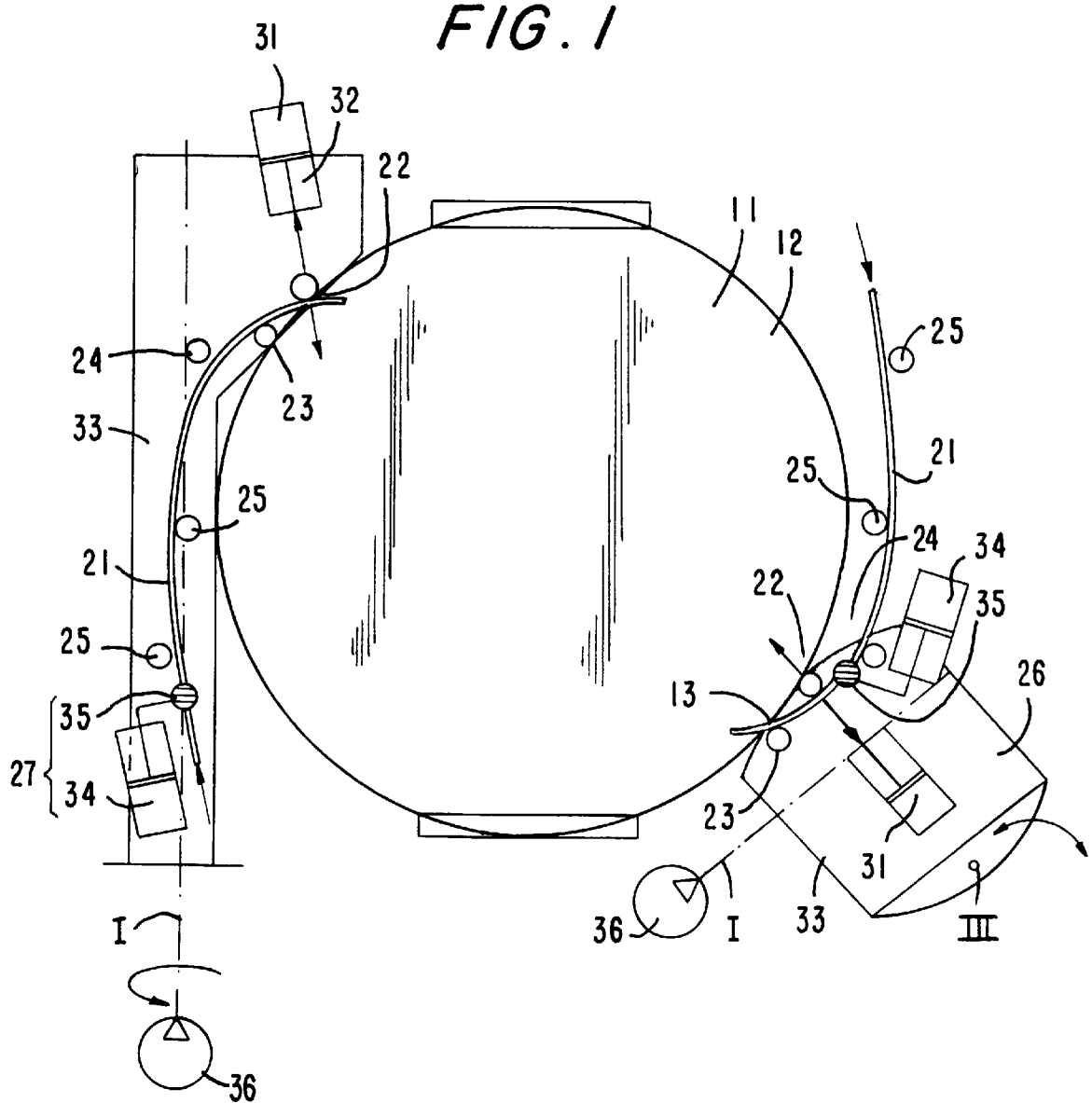
FIG. 1 is a diagrammatic plan view of the positioning device according to an embodiment of the invention.
Figure 2:
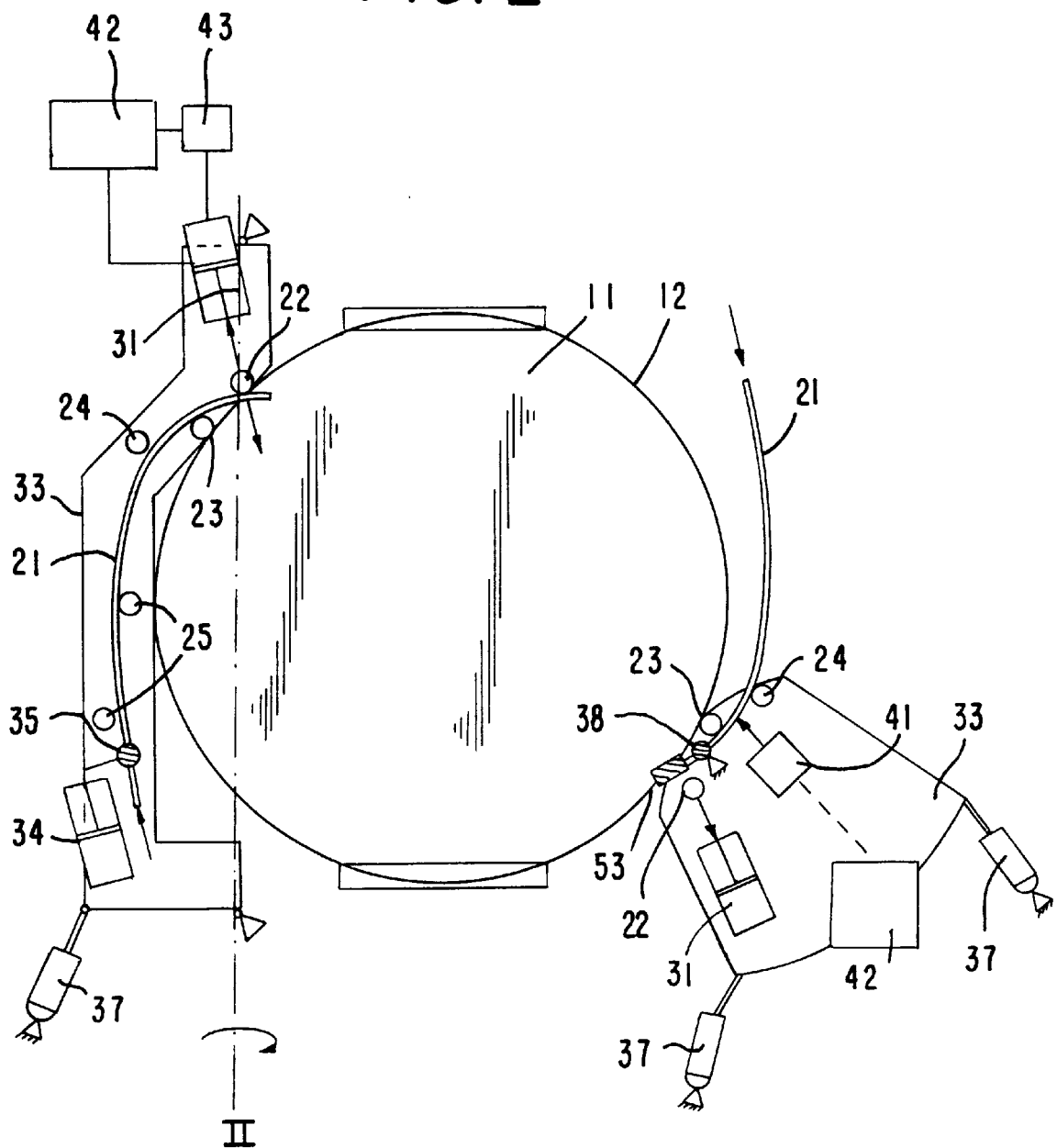
FIG. 2 is a diagrammatic plan view of the positioning device according to another embodiment of the invention.

FIGS. 1 and 2 show a metallurgical vessel 11 in which a lance 21 is guided along the side. In the front area, the lance 21 penetrates through the wall 12 of the metallurgical vessel 11 via a vessel aperture.

The lance 21 is guided by guide rolls 25 and, at its front end, is bent over rolls 22–24. Rolls 22–24 make up a lance guiding station. The roll 22 is in this case connected to a displacement unit 31. Displacement device 31 is a linear force-exerting unit such as a hydraulic piston-cylinder 32.

In order to move the lance onward, a drive device 34 is provided, which acts on the lance 21 via drive elements 35. Drive elements 35 make up a lance conveying station 27 operating under the control of drive device 34.

The drive unit 34 and the displacement unit 31 are arranged on a platform 33. In FIG. 1, rotary drives 36 are provided which move the platform 33 about the tilting axis I. Furthermore, in the right-hand part of FIG. 1, a pivot pin III is provided, by means of which the platform 33 can be pivoted out of its working area.

In the left-hand part of FIG. 2, the platform 33 is arranged in such a manner that it can be tilted about an imaginary line II. This line II runs through the intersection between the lance 21 and the vessel wall 12. A piston-cylinder unit is provided as the tilting drive 37.

In the right-hand part of FIG. 2, the platform 33 as a whole is mounted on three points, specifically on an articulated link 38 and two tilting drives 37. This arrangement allows the platform 33 to be positioned wherever required in the space about the articulated link 38. The lance feed is in this case designed such that the movement is not impeded. The free movement of the platform 33 makes it easy to adjust the lance mouth.

Furthermore, in the right-hand part of the figure, a displacement-measuring device 41 connected to the lance 21 is arranged on the platform 33, and enables any connection pieces of the individual lance sections to be detected. The displacement-measuring device 41 is connected, via an actuator 42, in control terms to the displacement unit 31. Displacement-measuring device 41 measures the displacement of lance 21 as produced by displacement unit 31, and is also capable of measuring the diameter of lance 21. As indicated in the sketch, the displacement roll 22 is retracted by the displacement unit 31 for as long as the connecting sleeve 53 is situated in its working area. As a result, a defined section of the lance is not bent.

In the left-hand part of FIG. 2, a force-measuring station or device 43 is directly connected to the displacement unit 31, and is adapted to immediately detect changes in force when bending, for example in the area of a connecting sleeve which connects two lance parts, and reduces the force appropriately. To this end, the force-measuring device 43 and the displacement unit 31 are connected to an actuator 42.

Figure 3A:
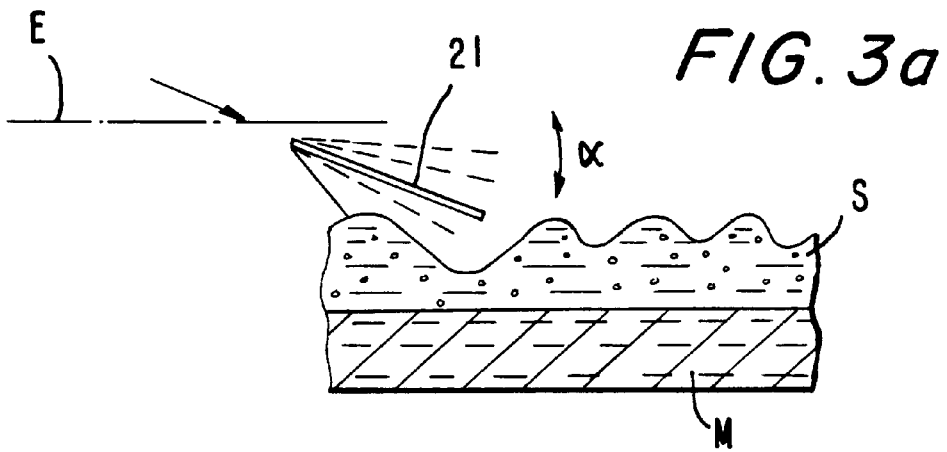
FIG. 3a is a schematic view of individual angular positions of the lance mouth.
Figure 3B:
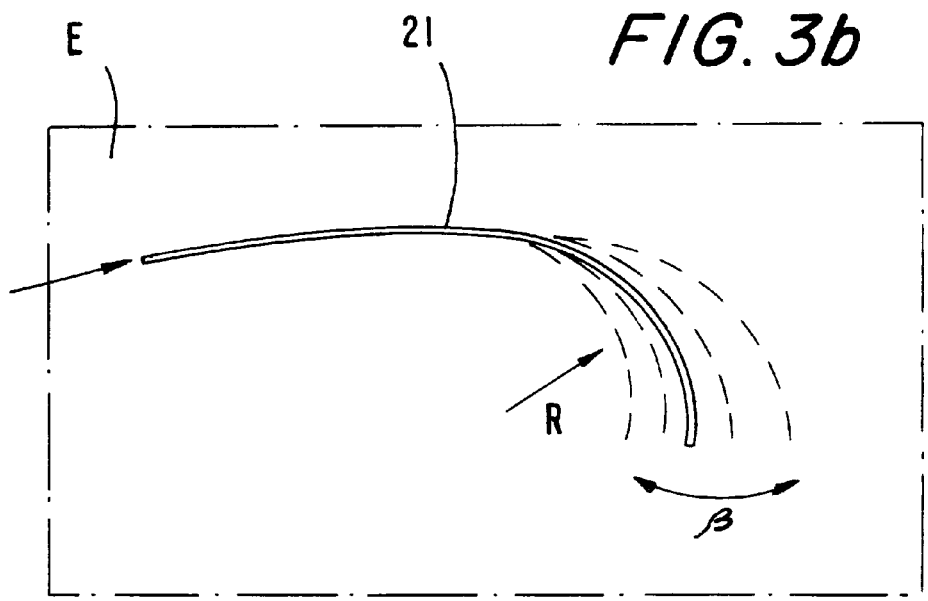
FIG. 3b is a schematic view of the radial positions of the lance mouth according to the invention.

FIGS. 3a and 3b show the top part of a plane E which is arranged above the level of the liquid metal M which is covered with slag S. FIG. 3a also provides a sketch of the end of the lance 21, which can be varied in the vertical direction through a fan angle α.

FIG. 3b shows a plan view of the plane E with the lance 21 which in the front area can be bent into the radii R and can thus be adjusted in the horizontal direction through the fan angle β.

Figure 4A:
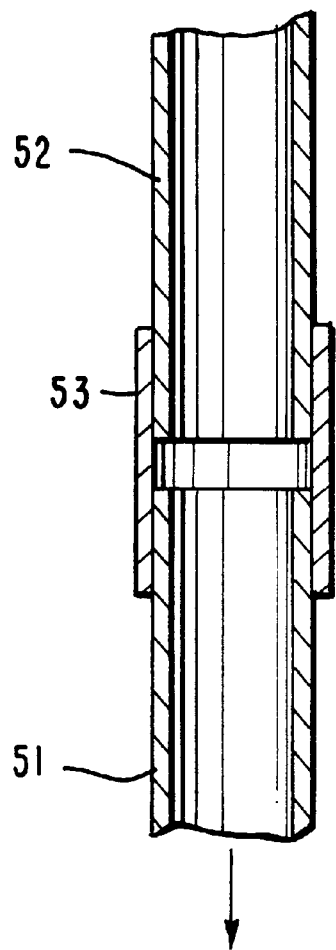
FIG. 4a is a sectional view of a pipe joint when extending the lance according to a first embodiment of the invention.
Figure 4B:
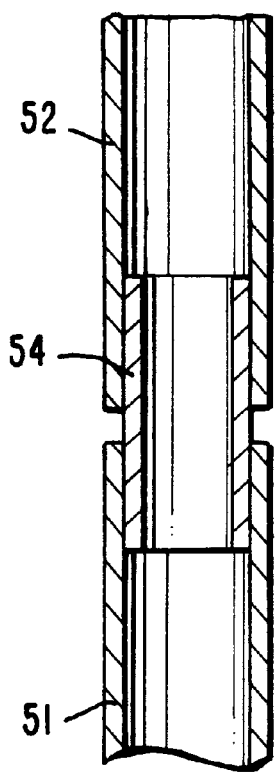
FIG. 4b is a sectional view of a pipe joint when extending the lance according to a second embodiment of the invention.
Figure 4C:
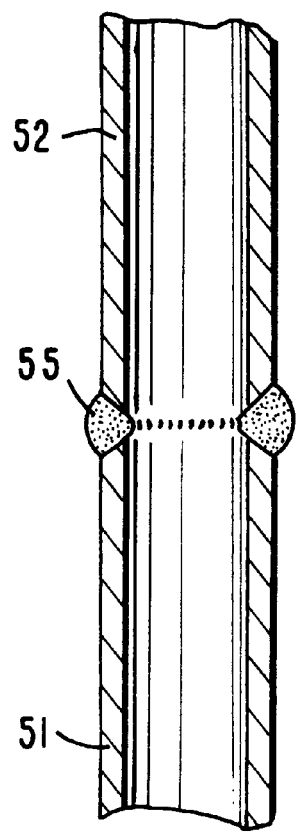
FIG. 4c is a sectional view of a pipe joint when extending the lance according to third embodiment of the invention.

FIGS. 4a, 4b and 4c shows theoretical possibilities for connecting two lance sections, specifically the consumed lance section 51 and the extension lance section 52.

FIG. 4a shows the connection of the two lance sections by means of an external connecting sleeve 53.

FIG. 4b shows the connection of the two lance sections by means of an internal connecting sleeve 54.

FIG. 4c shows the connection of the two lance sections by means of a weld joint 55.

What is claimed is:

1. A method for positioning a mouth of a consumable lance to convey gaseous and/or solid media in a metallurgical vessel which is filled with liquid metal, comprising the steps of:

tangentially guiding the lance to the metallurgical vessel in a plane which lies above a level of the liquid metal;

bending a mouth area of the lance outside the vessel toward the vessel interior through a radius so as to position the lance mouth in the shape of a fan; and pushing the lance through a side wall of the furnace vessel into the interior of the furnace in order to one of reach and maintain a desired position of the lance.

2. The method set forth in claim 1, further comprising applying a force that effects elastic bending of the lance prior to entering the interior of the vessel.

3. The method set forth in claim 1 further comprising applying a force that effects plastic deformation of the lance in order to achieve the radius.

4. The method set forth in claim 1, wherein said step of pushing is performed at a rate which is dependent on a burning of the mouth.

5. The method set forth in claim 4, further comprising vertically adjusting the mouth of the lance, said vertically adjusting comprising twisting the lance substantially about its longitudinal axis in an area in front of the bending point.

6. The method set forth in claim 1, wherein the lance comprises a plurality of pipe sections, said pipe sections being connected to one another at joints in a form-fitting manner, wherein said joints are not bent during displacement of the lance.

7. The method set forth in claim 1, wherein the lance comprises a plurality of pipe sections, said pipe sections being connected to one another at joints in an integrally formed manner, wherein said joints are not bent during displacement of the lance.

8. A device for positioning a mouth of a consumable lance for conveying gaseous and/or solid media in a metallurgical vessel filled with liquid steel, the lance being connected to supply units for gas and solids, the lance being displaceable over guide element arranged outside the vessel so as to guide it into the vessel through a vessel aperture; the device comprising:

a lance-guiding station having at least three rolls provided in a plane above the liquid metal, wherein two of said rolls are arranged on one side of the lance, and another roll is arranged on an opposing side of the lance such that said rolls form a triangle, at least one of said at least three rolls being displaceable substantially perpendicular to a main axis of the lance and parallel with the plane.

9. The device according to claim 8, further comprising a displacement unit connected to a penultimate roll of said at least three rolls before the metallurgical vessel.

10. The device according to claim 9, wherein said displacement unit comprises a linear force-exerting unit.

11. The device according to claim 10, wherein said linear force-exerting unit comprises a hydraulic piston cylinder.

12. The device according to claim 10, further comprising a platform on which said at least three rolls and said displacement unit are arranged, said platform having a tilting axis and being pivotable about said tilting axis coaxially with respect to a longitudinal axis of a straight area of the lance, and wherein said tilting axis lies on an imaginary line that intersects a vessel wall at the vessel aperture for the lance.

13. The device according to claim 8, further comprising a lance-conveying station having drive elements connected to a drive unit, said drive elements partially surrounding the lance.

14. The device according to claim 8, further comprising a displacement measuring device connected to said displacement unit and an actuator for controlling said measuring device, said measuring device for detecting a diameter of the lance.

15. The device according to claim 5, further comprising a force measuring device connected to said displacement unit for measuring the bending force exerted by said displacement unit.

\* \* \* \* \*